US009811239B2

(12) United States Patent
Felt

(10) Patent No.: US 9,811,239 B2
(45) Date of Patent: Nov. 7, 2017

(54) SYSTEMS AND METHODS FOR EFFICIENTLY SEARCHING APPLICATIONS

(71) Applicant: Cellco Partnership, Basking Ridge, NJ (US)

(72) Inventor: Michelle Felt, Randolph, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 772 days.

(21) Appl. No.: 14/269,665

(22) Filed: May 5, 2014

(65) Prior Publication Data

US 2015/0317063 A1 Nov. 5, 2015

(51) Int. Cl.
*G06F 3/0482* (2013.01)
*G06F 3/0488* (2013.01)
*G06F 3/0484* (2013.01)
*G06F 3/0481* (2013.01)
*H04L 29/08* (2006.01)
*H04M 1/725* (2006.01)
*H04W 4/00* (2009.01)

(52) U.S. Cl.
CPC .......... *G06F 3/0482* (2013.01); *G06F 3/0488* (2013.01); *G06F 3/04817* (2013.01); *G06F 3/04842* (2013.01); *H04L 67/10* (2013.01); *H04M 1/72522* (2013.01); *H04M 2250/22* (2013.01); *H04W 4/003* (2013.01)

(58) Field of Classification Search
CPC ... G06F 3/0482; G06F 3/04817; G06F 3/0488
USPC ................................................. 715/700–866
See application file for complete search history.

(56) References Cited

U.S. PATENT DOCUMENTS

| | | | | |
|---|---|---|---|---|
| 6,910,191 | B2* | 6/2005 | Segerberg .......... | H04N 5/44543 348/E5.105 |
| 6,966,037 | B2* | 11/2005 | Fredriksson .......... | G06F 3/0481 715/767 |
| 8,042,063 | B1* | 10/2011 | Lin-Hendel .......... | G06F 3/0482 715/805 |
| 2003/0169302 | A1* | 9/2003 | Davidsson .......... | G06F 3/04886 715/810 |
| 2004/0233239 | A1* | 11/2004 | Lahdesmaki ......... | G06F 3/0482 715/810 |
| 2005/0235209 | A1* | 10/2005 | Morita .................. | G06F 3/0482 715/716 |
| 2009/0307105 | A1* | 12/2009 | Lemay ...................... | G06F 8/61 705/26.1 |

(Continued)

*Primary Examiner* — Abdullah Al Kawsar
*Assistant Examiner* — Daniel Samwel

(57) ABSTRACT

Systems and methods for efficiently searching for applications on a mobile device are presented. A user may be provided with an interface on the display screen of his mobile device. The interface may display a collection of categories associated with one or more applications. If the user selects a category, the interface may display a collection of one or more subcategories associated with the selected category, and a selectable cursor that is configured to allow the user to select one of the subcategories by moving the cursor through a grid in the interface. In response to the user selecting one of the subcategories, the interface may display a collection of applications associated with the selected subcategory, and the user may select one of the applications using the selectable cursor and grid. A user can select an application to purchase and/or download onto his mobile device.

20 Claims, 10 Drawing Sheets

(56) References Cited

U.S. PATENT DOCUMENTS

| | | | | |
|---|---|---|---|---|
| 2010/0154005 A1* | 6/2010 | Baxter | ............ | G06F 17/30038 |
| | | | | 725/56 |
| 2011/0099519 A1* | 4/2011 | Ma | ........................ | G06F 3/0482 |
| | | | | 715/811 |
| 2013/0326399 A1* | 12/2013 | Ferren | .................. | G06K 9/3266 |
| | | | | 715/784 |
| 2014/0149939 A1* | 5/2014 | Toh | .................... | H04N 21/4314 |
| | | | | 715/835 |

* cited by examiner

SYSTEMS AND METHODS FOR EFFICIENTLY SEARCHING APPLICATIONS

BACKGROUND INFORMATION

The market for mobile applications continues to grow rapidly. There are over a million applications on the market, designed to run on smartphones and tablets. Currently, it is very difficult and cumbersome to search for new applications using "application store" programs on a mobile device. The interfaces for these programs do not make efficient use of the limited screen sizes of most mobile devices.

These and other drawbacks exist.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

Figure 1:
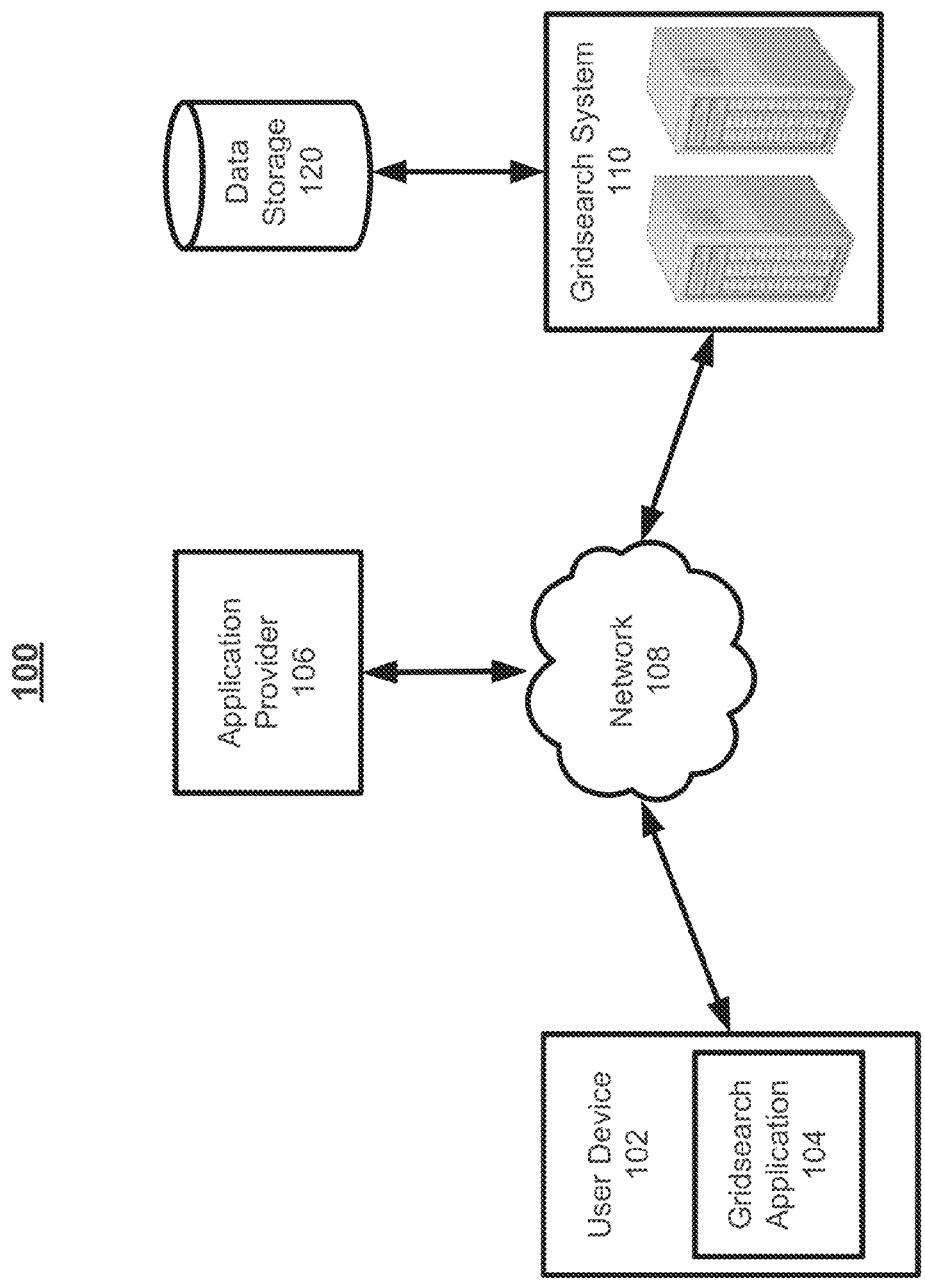
FIG. 1 is a schematic diagram illustrating a system according to a particular embodiment.

A system and method described here may include various embodiments for efficiently searching for and displaying applications in an interface on a mobile device. A mobile device may include an interface that allows users to search for applications by filtering the options without using pop-up windows or a tiresome number of steps. In the interface, the user may first be presented with a list of categories. The interface may be associated with a collection of applications, and each application may have been previously assigned to one or more categories. After the user selects a category, the interface may present a list of one or more subcategories within that category. Each application may have been previously assigned to one or more subcategories within each category.

The interface may provide the user with an interactive cursor within a grid. The cursor may be configured to move within the grid in response to the user's interaction with the touchscreen on the mobile device. As the user moves the cursor through the grid, he may be able to select one of the subcategories. Once the user selects a subcategory, the interface may display a list of applications, from which the user can select a particular application using the same cursor/grid configuration. This technology allows more data to be accessed in a smaller space with minimal finger-movement and thus may maximize the real estate of the screen on the mobile device.

The description below describes interface modules, category modules, selection modules, grid modules, user devices, application providers, computer systems, and networks that may include one or more modules, some of which are explicitly shown while others are not. As used herein, the term "module" may be understood to refer to computing software, firmware, hardware, and/or various combinations thereof. It is noted that the modules are examples. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

It is further noted that software described herein may be tangibly embodied in one or more physical media, such as, but not limited to, a compact disc ("CD"), a digital versatile disc ("DVD"), a floppy disk, a hard drive, read only memory ("ROM"), random access memory ("RAM"), as well as other physical media capable of storing software, and/or combinations thereof. The functions described as being performed at various components may be performed at other components, and the various components may be combined and/or separated. Other modifications also may be made.

FIG. 1 is a schematic diagram illustrating a system according to a particular embodiment. A system 100 may include user device 102, application provider 106, a network 108, gridsearch system 110, and data storage 120. Although elements of system 100 may be described as a single device, it will be appreciated that multiple instances of these devices may be included in system 100, such as, for example, multiple user devices, multiple application providers, multiple gridsearch systems, multiple data storages, and multiple networks. A user may be associated with user device 102.

User device 102 may be, for example, but not limited to, a cellular telephone, Session Initiation Protocol ("SIP") phone, software client/phone, a desktop computer, a laptop/notebook, a server, a module, a satellite phone, a personal digital assistant ("PDA"), a tablet computer, a smart phone, a remote controller, a personal computer ("PC"), a workstation, a handheld PC, a handheld MP3 player, a handheld video player, a personal media player, a gaming device, a thin system, a fat system, a network appliance, and/or other mobile communication device that may be capable of transmitting and/or receiving data. Also, user device 102 may include one or more transmitters, receivers, and/or transceivers to transmit and/or receive one or more signals to and/or from other components depicted in FIG. 1, including, for example, gridsearch system 110, and application provider 106.

Application provider 106 may be one or more individuals or entities that create applications configured to run on user device 102. The applications may be software applications configured to perform one or more functions on user device 102. The applications may be mobile applications (e.g., for a smartphone or a tablet computer). Application provider 106 may provide the applications to gridsearch system 110. Application provider 106 may host one or more web portals that user device 102 can access in order to download applications directly from application provider 106.

Network 108 may be a wireless network, a wired network, or any combination of wireless network and wired network. For example, network 108 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and/or receiving a data signal. In addition, network 108 may include, without limitation, telephone line, fiber optics, IEEE Ethernet 802.3, a wide area network ("WAN"), a local area network ("LAN"), or a global network such as the Internet. Also, network 108 may support, an Internet network, a wireless communication network, a cellular network, or the like, or any combination thereof. Network 108 may be a 4G network that complies with the International Mobile Telecommunications Advanced (IMT-Advanced) specification. Network 108 may be a Long Term Evolution (LTE) network. Network 108 may be a LTE Advanced (LTE-A) network. Network 108 may be a Mobile WiMAX (IEEE 802.16e). Network 108 may be a Mobile WiMAX Release 2 (IEEE 802.16m) network. Network 108 may further include one, or any number of the exemplary types of networks mentioned above operating as a stand-alone network or in cooperation with each other. Network 108 may utilize one or more protocols of one or more network elements to which it is communicatively coupled. Networks 108 may translate to or from other protocols to one or more protocols of network devices. Although network 108 is depicted as one network, it should be appreciated that according to one or more embodiments, network 108 may comprise a plurality of interconnected networks, such as, for example, a service provider network, the Internet, a broadcaster's network, a cable television network, corporate networks, and home networks.

The components depicted in FIG. 1 may transmit and receive data to and from network 108 representing broadcast content, user request content, parallel search queries, parallel search responses, and other data. The data may be transmitted and received utilizing a standard telecommunications protocol or a standard networking protocol. For example, one embodiment may utilize Session Initiation Protocol ("SIP"). In other embodiments, the data may be transmitted and/or received utilizing other Voice Over IP ("VOIP") or messaging protocols. For example, data may also be transmitted and/or received using Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet ("TCP/IP") Protocols, or other protocols and systems suitable for transmitting and receiving broadcast or parallel search data. Data may be transmitted and received wirelessly or may utilize cabled network or telecom connections such as an Ethernet RJ45/Category 5 Ethernet connection, a fiber connection, a traditional phone wireline connection, a cable connection or other wired network connection. Network 108 may use standard wireless protocols including IEEE 802.11a, 802.11b and 802.11g. Network 108 may also use protocols for a wired connection, such as an IEEE Ethernet 802.3.

Data storage 120 may be network accessible storage and may be local, remote, or a combination thereof to the components depicted in FIG. 1. Data storage 120 may utilize a redundant array of inexpensive disks ("RAID"), tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), or other computer accessible storage. In one or more embodiments, data storage 120 may be a database, such as an Oracle database, a Microsoft SQL Server database, a DB2 database, a MySQL database, a Sybase database, an object oriented database, a hierarchical database, or other database. Data storage 120 may utilize flat file structures for storage of data. Data storage 120 may be communicatively coupled to gridsearch system 110, or to any other component depicted in FIG. 1. Any of the other components depicted in FIG. 1 may include one or more data storages as well.

User device 102 may include gridsearch application 104. Gridsearch application 104 may be a combination of software and hardware configured to provide one or more GUIs for user device 102 to transmit data to and from gridsearch system 110. Data may include a user's selection of one or more categories and/or subcategories, as will be described below. Gridsearch application 104 may be a local application on user device 102. Gridsearch application 104 may be a web-based application hosted by gridsearch system 110.

Gridsearch system 110 may include one or more devices, modules, and/or components for providing routing information for transmitting data over a network, such as, for example, an IP network and/or a PSTN. For example, gridsearch system 110 may be part of, or communicatively coupled to, application provider 106, and may receive a request from a user device to download one or more applications supplied by application provider 106. Gridsearch system 110 may include one or more computer systems and/or processors to provide a unique interface for organizing and displaying applications from application provider 106 for viewing by user device 102. Gridsearch system 110 may include an interface module, a category module, a selection module, and a grid module as described herein in reference to FIG. 2. In other embodiments, gridsearch system 110 may be implemented as an application on user device 102. Gridsearch system 110 may comprise one or more network enabled computers. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. In other embodiments, gridsearch system 110 may be implemented as part of a software application on user device 102. For example, gridsearch system 110 may be implemented as gridsearch application 104.

Figure 2:
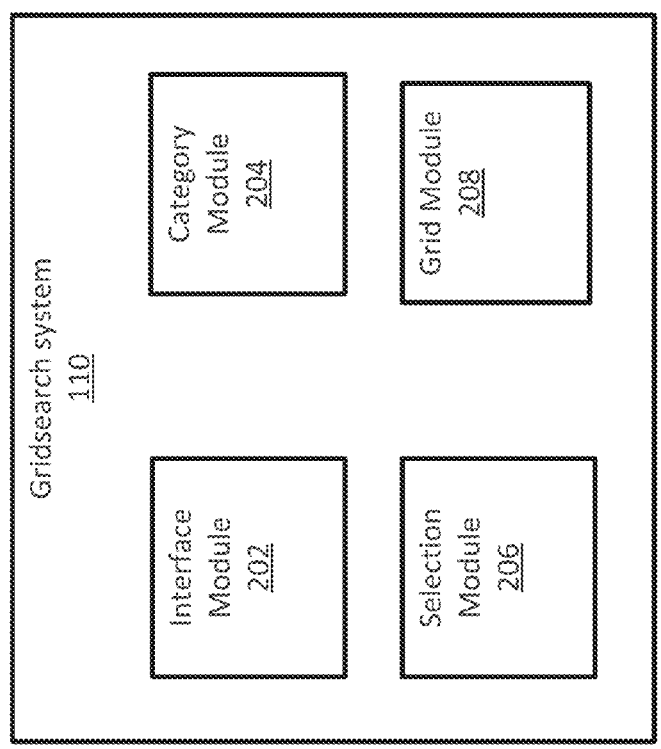
FIG. 2 is a schematic diagram of a hardware component of the system of a particular embodiment.

FIG. 2 is a block diagram of a hardware component of an exemplary embodiment of gridsearch system 110. For example, gridsearch system 110 may include an interface module 202, a category module 204, selection module 206, and grid module 208. It is noted that modules 202, 204, 206, and 208, are exemplary and the functions performed by one or more of the modules may be combined with that performed by other modules. The functions described herein as being performed by modules 202, 204, 206, and 208 may also be separated and may be performed by other modules at devices local or remote to gridsearch system 110. The modules may each be a computer program or an appropriately programmed computer, such as a mainframe or personal computer, or may include a plurality of such computers cooperating to perform the functionality described herein. Modules 202, 204, 206, and 208 may also communicate with data storage 120. Modules 202, 204, 206, and 208 may also be coupled to or integrated with gridsearch system 110. For example, modules 202, 204, 206, and 208 may be external devices that are wirelessly coupled and/or communicatively coupled to gridsearch system 110 via an interface port which may include, without limitation, USB ports, system bus ports, or Firewire ports and other interface ports. Further, computer code may be installed on gridsearch system 110 to control and/or operate a function of interface module 202, category module 204, selection module 206, and/or grid module 208.

Interface module 202 may be configured to interface with user device 102. Interface module 202 may represent a network connection between user device 102 and gridsearch system 110. Interface module 202 may receive data from user device 102 and provide data to user device 102. The user of user device 102 may interact with interface module 202 using manual input (e.g., typing into a keyboard or keypad, etc.), voice input, touch screen input, graphical input (e.g., camera or camcorder) and/or any other method for inputting information or data to user device 102. Interface module 202 may provide a series of interactive screens for display for user device 102. User device 102 may access interface module 202 via gridsearch application 104. Interface module 202 may display a "store" where the user of user device 102 can browse, view, purchase, and/or download a series of applications that are configured to run on user device 102. The applications may be provided to gridsearch system by application provider 106. The applications may be stored in data storage 120.

FIGS. 4A-4D, 5A, 5B, and 6 show various screenshots of different embodiments of the interface presented by interface module 202 on the screen of user device 102. User device 102 may access these screens by opening gridsearch application 104. User device 102 may access these screens by accessing a web portal hosted by gridsearch system 110 and/or application provider 106. The functions and features of the different screens will be described in greater detail below.

Figure 4A:
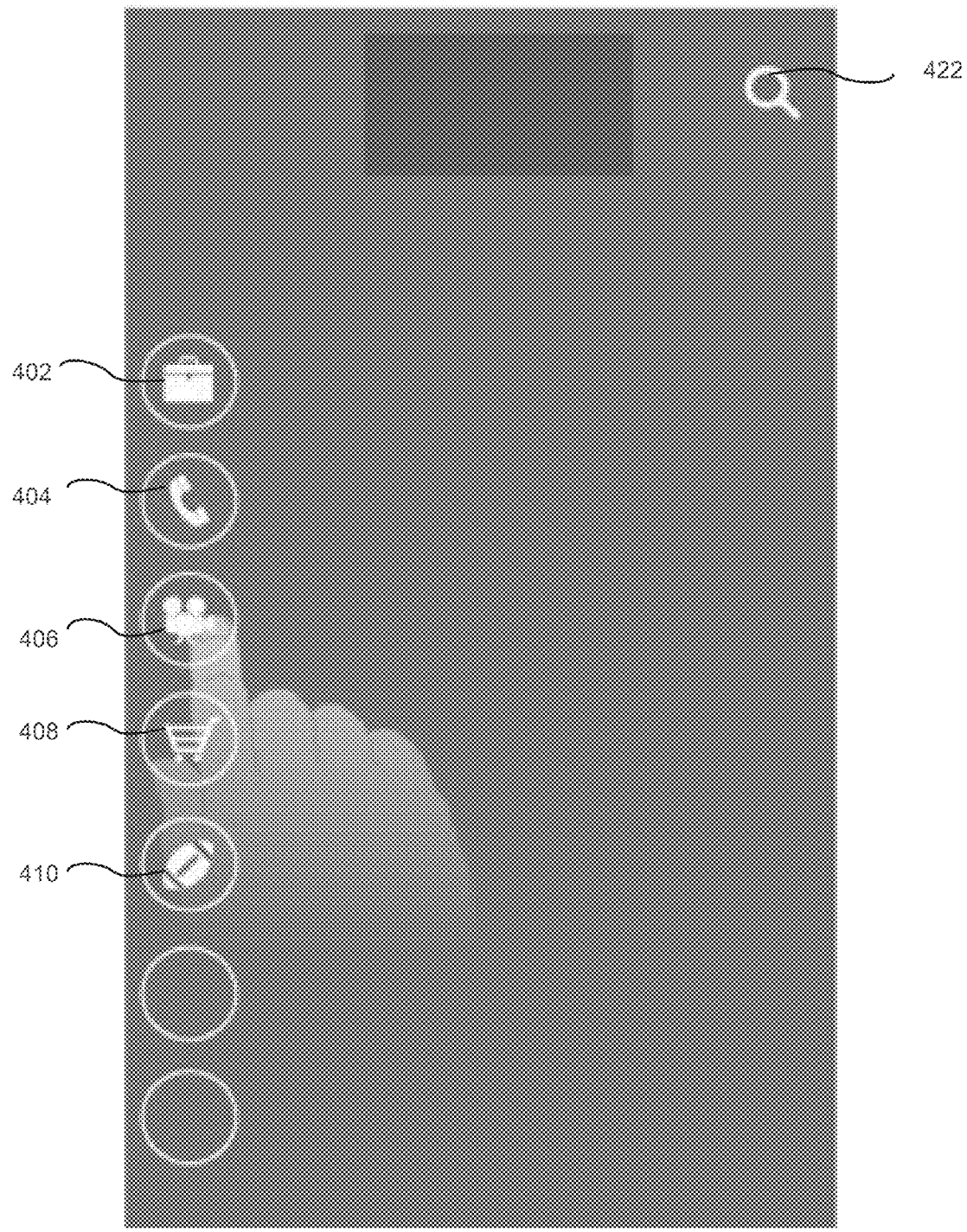
FIGS. 4A, 4B, 4C, and 4D depict screenshots of a particular embodiment.

Category module 204 may be configured to assign each application to various categories and subcategories. FIG. 4A shows an embodiment of an initial screen presented by interface module 202 for the application store when user device 102 first connects. The screen may show a series of icons (402-410) arranged vertically on the left side of the screen. In other embodiments, the icons may be arranged horizontally across the top of the screen (or the bottom). The screen may also include a search option 422, shown as a magnifying glass in the top right hand corner of the screen, which may be activated by user contact with search option 422.

Figure 4B:
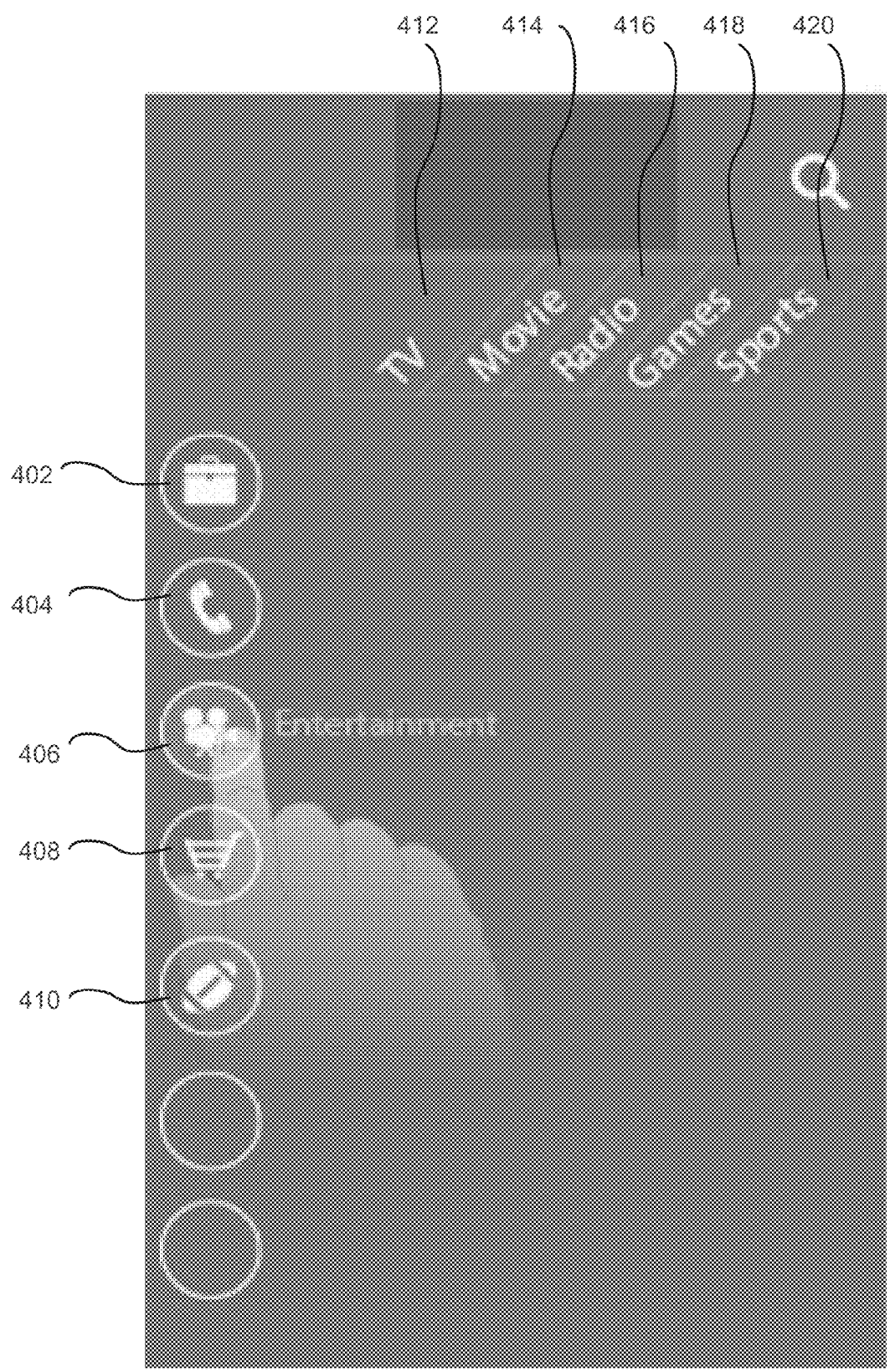

Category module 204 may assign each application to a category and/or one or more subcategories (within that category) based on information received from application provider 106. The information may include the name of the application, the type of application, a description of the application's function or functions, and other relevant information. Category module 204 may maintain one or more categories. The categories may include, without limitation, entertainment, sports, finance, recreation & leisure, travel, work, food, gardening, etc. In the embodiment shown in FIG. 4A, each category may be represented by an icon on the left side of the screen. In this embodiment, categories may include "finance" 402, "communication" 404, "entertainment" 406, "shopping" 408, and "sports" 410. When a user selects one of the categories (e.g., using a touchscreen on user device 102), a text box may appear describing the category, as shown in FIG. 4B. In another embodiment shown in FIG. 6, categories 602-612 are shown as text boxes (instead of pictures or icons).

Category module 204 may assign an application to one category or to multiple categories depending on information related to the application, such as the application's title, the application's description (provided by, e.g., the application developer), and the functions performed by the application. The categories and/or subcategories may be created by application provider 106, gridsearch system 110, and/or a third party (not shown).

Selection module 206 may be configured to receive one or more selections from user device 102 and present an interactive feature for the user to make the selection. For example, a user may select the entertainment category 406 shown in FIG. 4A. The user may select this using the touchscreen of user device 102. Selection module 206 may receive the selection, and interface module 202 may present the screen shown in FIG. 4B.

FIG. 4B displays a screen displaying subcategories 412-420. These one or more subcategories 412-420 are subcategories within the "Entertainment" category 406. When a user of user device 102 selects the "entertainment" category 406 (e.g., by touching the icon on the touchscreen of user device 102), interface module 202 may display the subcategories within that category. The subcategories may be a first level of subcategories. In this embodiment, there are five subcategories within the "Entertainment" category 406: "TV" 412, "Movie" 414, "Radio" 416, "Games" 418, and "Sports" 420. Category module 204 may assign each of the one or more applications to one or more subcategories. This assignment may be based on information received from application provider 106. The subcategories may be displayed in a horizontal direction, on the top of the screen, as shown in FIG. 4B. In other embodiments, the subcategories may be displayed on the bottom of the screen. It should be understood that if the user had instead selected a different category, e.g., "Shopping" 408, the subcategories within that category may be displayed in the same region of the screen as the subcategories shown in FIG. 4B.

In some embodiments, the location of the categories and/or subcategories on the screen may depend on various factors. For example, if subcategories are arranged vertically, categories may be located from "top" to "bottom" of the screen based on various factors (e.g., popularity measured in the number of applications downloaded from within that subcategory, user ratings, number of applications assigned to that subcategory, number of users who access that subcategory).

Referring to FIG. 4A, within the "finance" category 402, subcategories may include, without limitation, "banking", "investing", "accounting", "bill paying", and "financial news". Subcategories within the "communications" category 404 may include, without limitation, "location services", "caller name ID", "widgets", "messaging", "voice mail", "email", and "searching". Subcategories within the "shopping" category 408 may include, without limitation, "rewards", "deals", "mapping", "restaurants", "clothing", "electronics", "appliances", "home & garden". Subcategories within the "sports" category 410 may include, without limitation, "Professional Sports", "College sports", "TV", "Football", "Basketball", "Hockey", "Soccer", and "Baseball". Category module 204 may assign the same subcategory to multiple categories. For example, the subcategory "professional sports" may be a subcategory for both "Sports" 410 and "Entertainment" 406.

In some embodiments, category module 204 may be configured to display categories unique to the user of user device 102. For example, the user may have an account that they log into (e.g., by supplying a username and password in gridsearch application 104) in order to interface with gridsearch system 110. Upon receiving the login credentials, category module 204 may display certain categories for the user based on different factors, such as demographic factors associated with the user, past applications downloads, most popular categories and/or subcategories selected by that user, and/or most popular categories and/or subcategories selected by other user's in a similar demographic. Thus, if the user is a 25 year-old male, category module 204 may show category "Sports" most prominently on the interface displayed on user device 102. If the user has downloaded applications from only the "Entertainment" category in the past, this category may be most prominently displayed for the user. A user may have the option of only viewing "favorites." Interface module 202 may receive inputs from the user to re-arrange the location of the categories on the screen. Interface module 202 may be configured to receive inputs from the user to select which categories and/or subcategories will be displayed to the user.

Figure 4C:
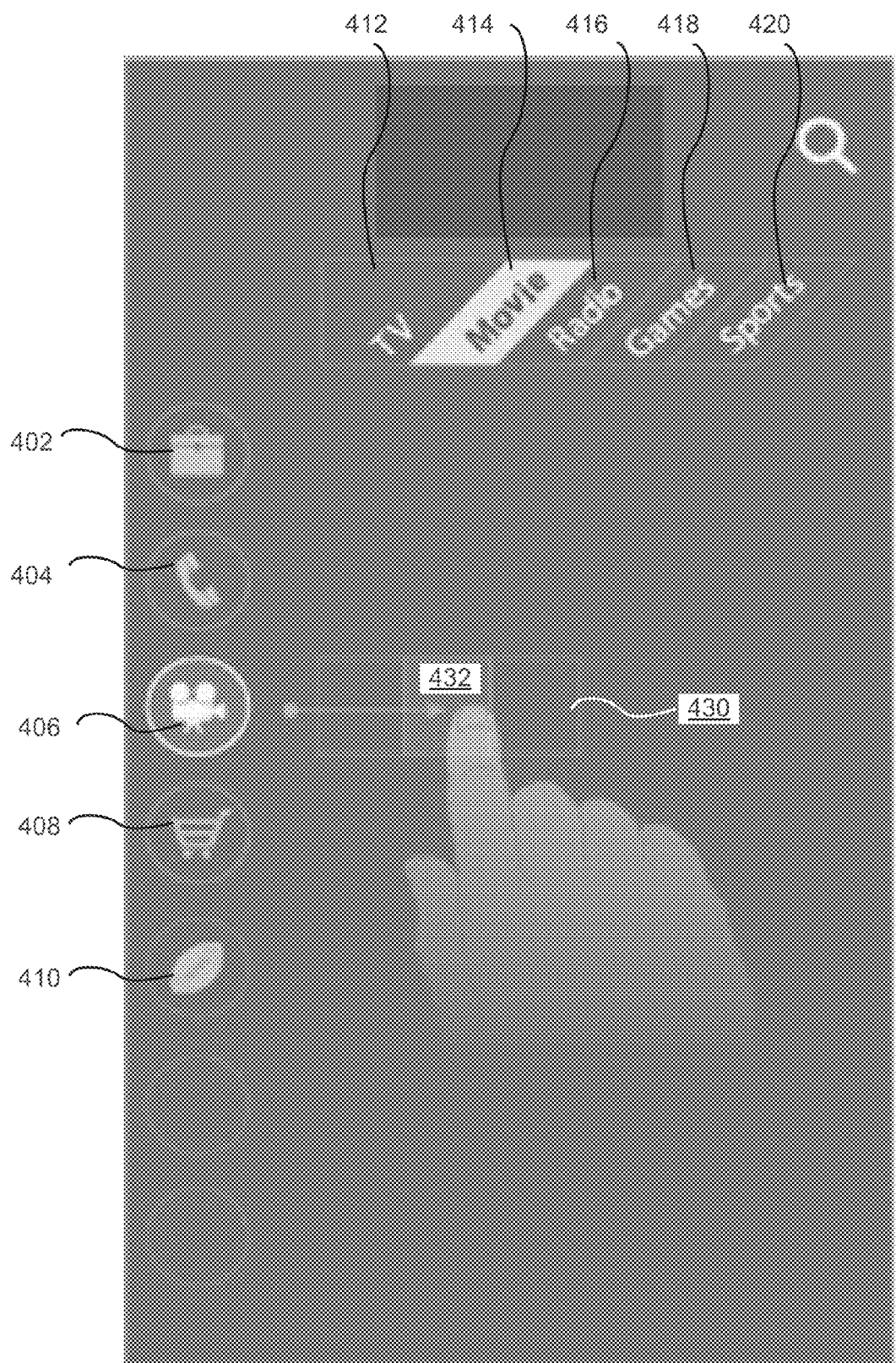

FIG. 4C shows how a user of user device 102 may select one of the one or more subcategories. Grid module 208 may be configured to display a grid 430 based on the user's selection. In this embodiment, selection module 206 may provide a graphical representation of a cursor 432 that the user can use to select and move horizontally across the screen through a grid 430. In FIG. 4C, the gridlines are of grid 430 are shown. In other embodiments, gridlines may be invisible to the user, or the grid 430 may be a single rectangle.

Cursor 432 may be graphically represented as a box, a circle, a lit space, or other interactive feature. In some embodiments, as the user moves cursor 432, user device 102 may emit one or more sounds (e.g., a "ring" or "ping") each time a different category is highlighted. If user device 102 has a touchscreen, cursor 432 may be configured to move in response to a user placing his finger on the portion of the screen of user device 102 where cursor 432 is displayed, as shown in FIGS. 4A-4D.

In the embodiment shown in FIG. 4C, as the user moves the cursor 432 horizontally through grid 430, selection module 206 may cause each of the one or more subcategoriesto be highlighted, depending on the horizontal position of cursor 432. In this embodiment, the user has moved the cursor 432 horizontally to highlight and/or select the "Movie" subcategory 414. In other embodiments, selection module 206 may configure the cursor 432 to move in a circular direction. Grid module 208 may configure grid 430 to be presented as a circular grid. A user may select a subcategory by pressing cursor 432 once, tapping cursor 432 once, a spoken selection, or other interactive means.

In some embodiments, the shape, color, and size of the cursor 432 may change depending on its position in grid 430 and the corresponding category or subcategory that is highlighted. For example, the cursor 432 may begin to "blink" or "flash" if it is moved to correspond to the position of a more popular category (based on other user's selections and/or the number of applications downloaded from the category). The shape of the cursor 432 may change to reflect the shape of the icon of the corresponding category or subcategory (e.g., if the cursor 432 is moved within grid 430 to a position corresponding to subcategory "radio" 416, the shape of cursor 432 may change to the shape of a radio).

Figure 4D:
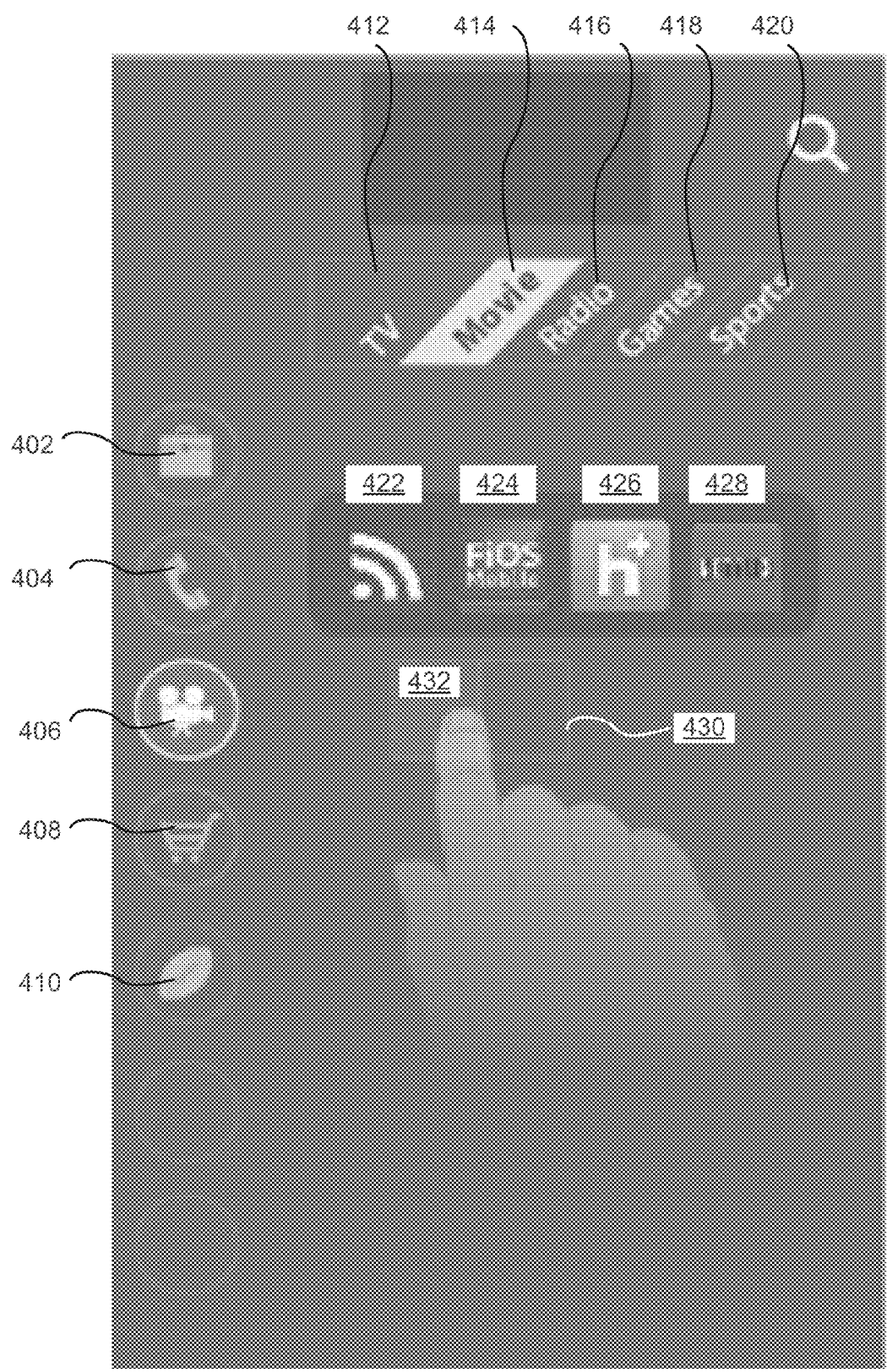

FIG. 4D shows an embodiment of a screen showing applications (422-428) that category module 204 has assigned to the "Movie" subcategory 414, within the "Entertainment" category 406. Icons representing applications 422-428 may be displayed after the user has selected subcategory 414 (from FIG. 4C). In this embodiment, there are four applications within the movie subcategory 414. Other embodiments may include more applications or fewer applications within the subcategory 414. Applications 422-428 may have been previously provided to gridsearch system 110 by application provider 106. Applications 422-428 may be stored in data storage 120. In some embodiments, the location of the applications on the screen may depend on various factors. For example, if applications are arranged vertically, applications may be located from "top" to "bottom" of the screen based on various factors (e.g., popularity of the applications based on the number of downloads, user ratings, most recent applications listed first). The user may be presented with applications that are most popular with other users in the same demographic (based on the login information that the user may have previously provided).

In FIG. 4D, grid module 208 may display the grid 430, and selection module 206 may show the cursor 432. The cursor 432 may be configured to move in a horizontal direction through grid 430. In other embodiments, grid module 208 may be configured to arrange grid 430 vertically and cursor 432 may move vertically in the grid 430. As cursor 432 moves horizontally, one of the applications 422-428 may be highlighted, allowing the user to "select" that application. In other embodiments, the icons representing only four of the applications within that subcategory may be displayed at one time. This may be due to the limited screen size of user device 102. As the user moves the cursor 432 horizontally, icons representing additional applications may be displayed for selection by the user. The additional icons may replace one or more of the icons 422-428 shown in FIG. 4D. A user may "select" an application in the same or similar manner that the user selected a category or subcategory on the screen. Once the user selects the application, interface module 202 may direct the user to a new screen that includes information about the application, instructions for how the user may download the application onto user device 102, and/or any payment information.

For example, if the user selects application 428 (Netflix), interface module 202 may display one or more screens showing specific information about the Netflix application. Information may include the price, the memory required for the application, the maker, a description of the functions performed by the application, ratings and reviews of the application provided by other users, version information, and/or updates.

Figure 5A:
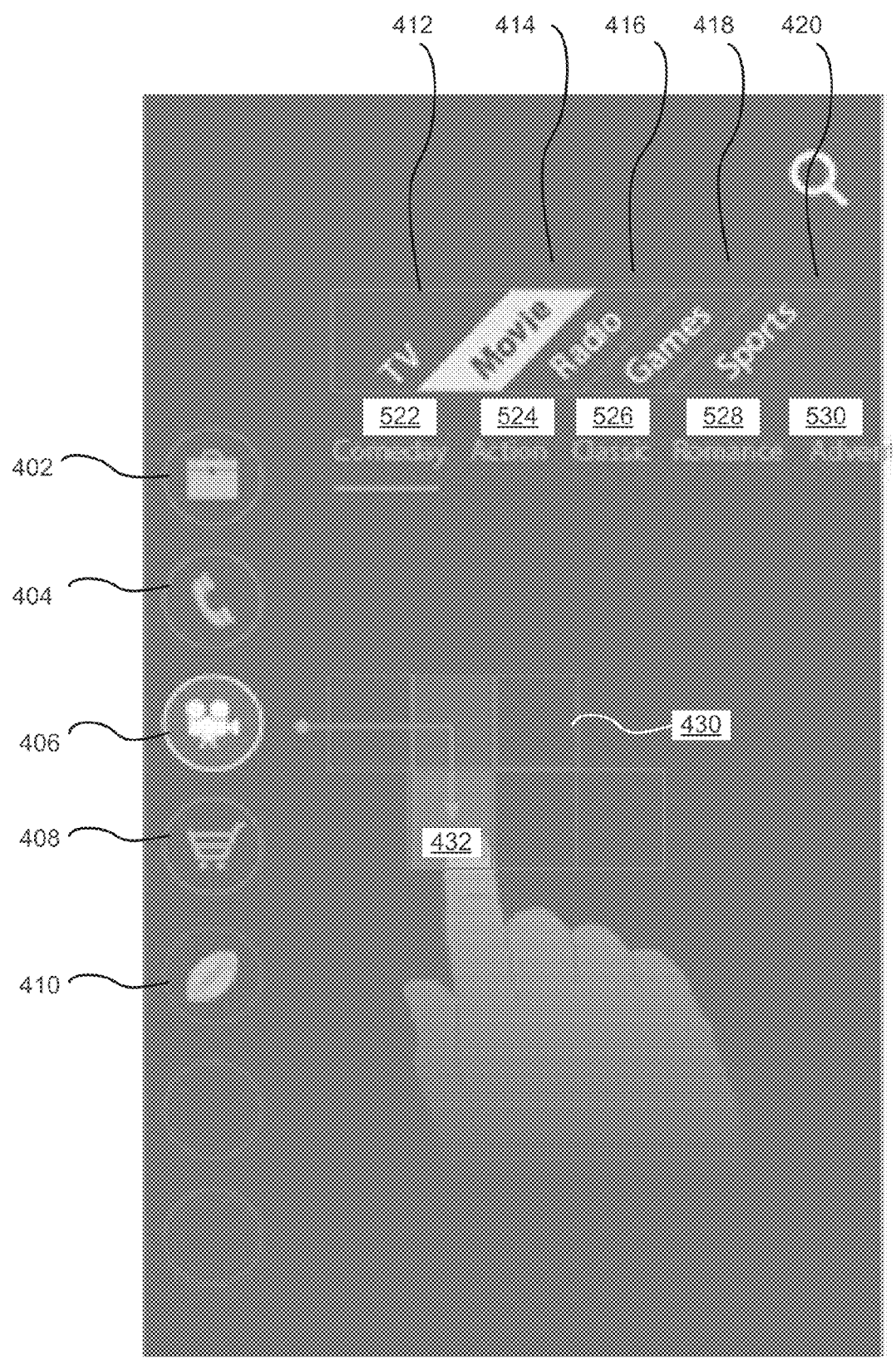
FIGS. 5A and 5B depict screenshots of a particular embodiment.

FIG. 5A shows an embodiment of a screen showing a second level of subcategories 522-530. Category module 204 may include multiple levels of subcategories. The screen shown in FIG. 5A may appear after the user in FIG. 4C selects the "Movie" subcategory 414. In this embodiment, the first level subcategory "Movie" 514 includes a second level of subcategories: "Comedy" 522, "Action" 524, "Classic" 526, "Romance" 528, and "Adventure" 530. Category module 204 may assign one or more applications to one or more second level subcategories within each first level subcategory.

As shown in FIG. 5A, grid module 208 may configure grid 430 to include one or more rows that allow cursor 432 to move vertically and horizontally within the grid 430. In FIG. 4C, when a user selects the subcategory "Movie" 414 using cursor 432 (by moving cursor 432 horizontally within grid 430 until the "Movie" subcategory is highlighted, and then selecting it), interface module 202, category module 204, selection module 206, and/or grid module 208 may show the screen in FIG. 5A. The user may then move the cursor 432 down in a vertical direction, as shown in FIG. 5A, in order to highlight one of the second level subcategories 522-530. In other embodiments, category module 204 may be configured to display the second level subcategories in response to the user moving cursor 432 in a vertical direction in grid 430 once a first level category is highlighted (as shown in FIG. 4C). In other embodiments, the user may move the cursor 432 up in a vertical direction in order to highlight one or more second level subcategories 522-530, which may be displayed above the first level subcategories. In other embodiments, the user may access different second level subcategories by moving cursor 432 up in a vertical direction versus moving the cursor down in a vertical direction relative to grid 430.

Figure 5B:
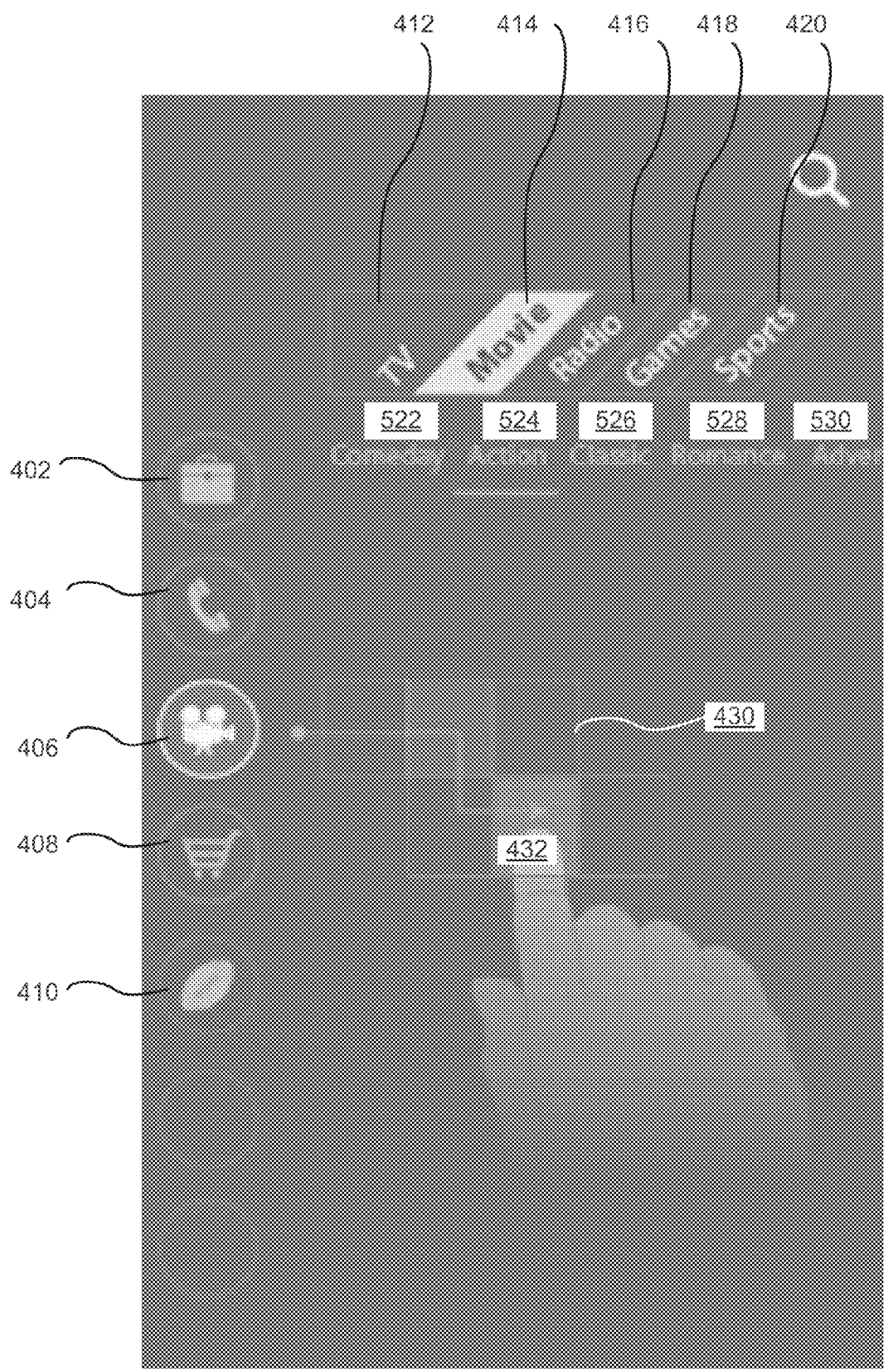

As shown in FIG. 5B, selection module 206 may configure cursor 432 to move horizontally to select one of the second level subcategories 522-530. Grid module 208 may display a second row of grid 430, and cursor 432 may be configured to move horizontally through the second row of grid 430 so that the user of user device 102 can select one of the one or more second level subcategories 522-530. As shown in FIG. 5B, the user has moved cursor 432 to the right so that second level subcategory "Action" 524 is highlighted. The user may select this "Action" 524 second level subcategory in the same way the user selected the first subcategory. In some embodiments, category module 204 may display a third level of subcategories within each subcategory in the second level of subcategories.

If a user is within a second level of subcategories, but wants to move up a level to the first level of subcategories, the user may move the cursor 432 back, retracing the path taken from the first level of subcategories. In some embodiments, grid module 208 may display a line within the grid that traces that path of cursor 432. In this way, a user may be able to easily retrace the path in order to move back up a level (e.g., from the second level of subcategories back to a first level).

Figure 6:
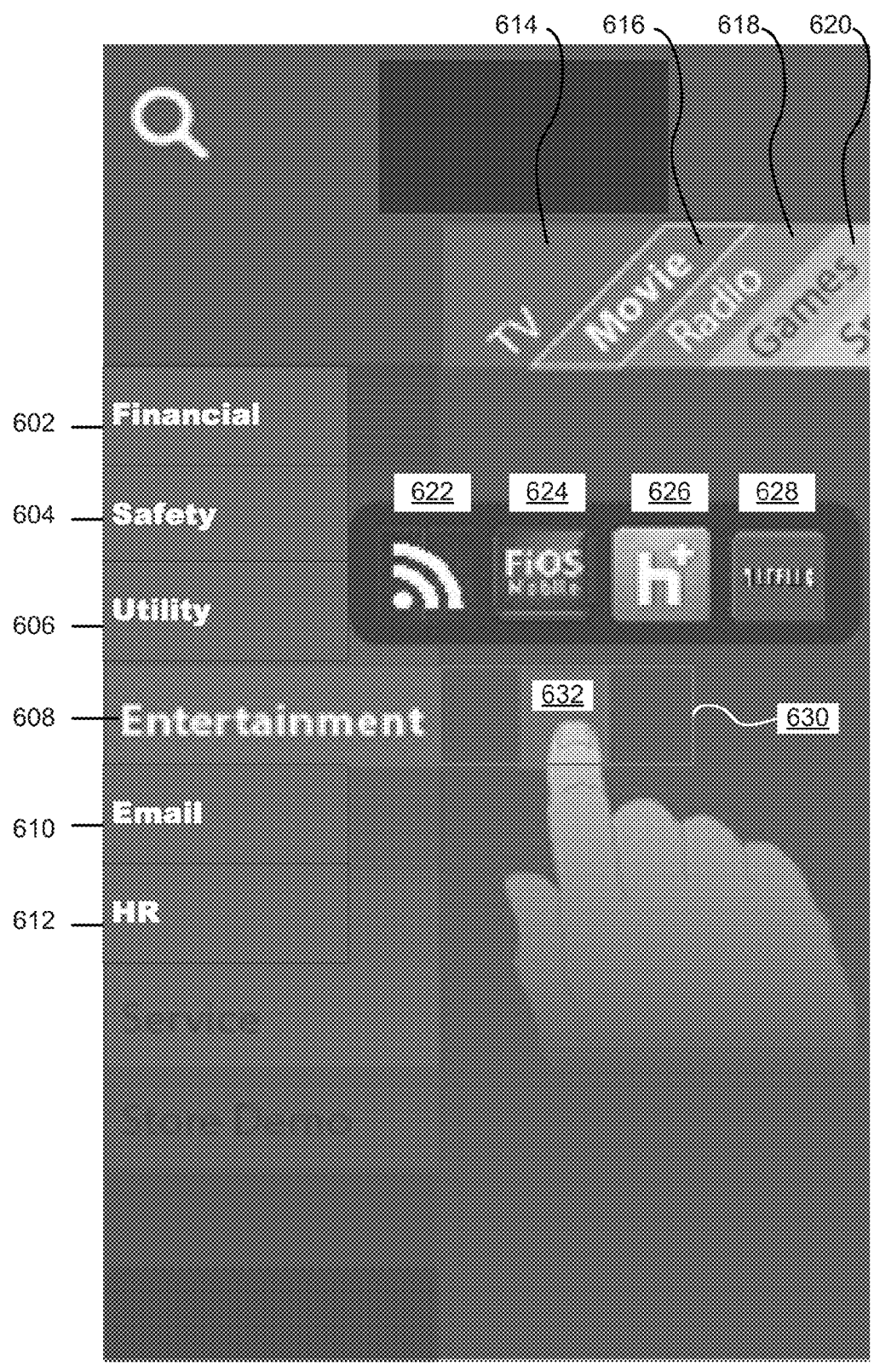
FIG. 6 depicts a screenshot of a particular embodiment.

If user selects the "Action" 524 second level subcategory, interface module may display a screen similar to the screen shown in FIG. 4D, and show a series of icons representing applications within the second level subcategory of "Action" movies. FIG. 6 shows an embodiment of a screen where the categories 602-612 are displayed as text instead of icons. In some embodiments, interface module 202 may give the user the option of selecting whether to view the categories and subcategories as icons or text, or some combination of the two. The subcategories 614-620 are shown as text as well. In other embodiments, category module 204 and/or interface module 202 may display each of the subcategories within each category as an icon. As shown in FIG. 6, selection module 206 provides a cursor 632 within a grid 630 that the user can use to select subcategories and/or applications within each subcategory (such as applications 622-628 within the "Movie" subcategory 616).

Figure 3:
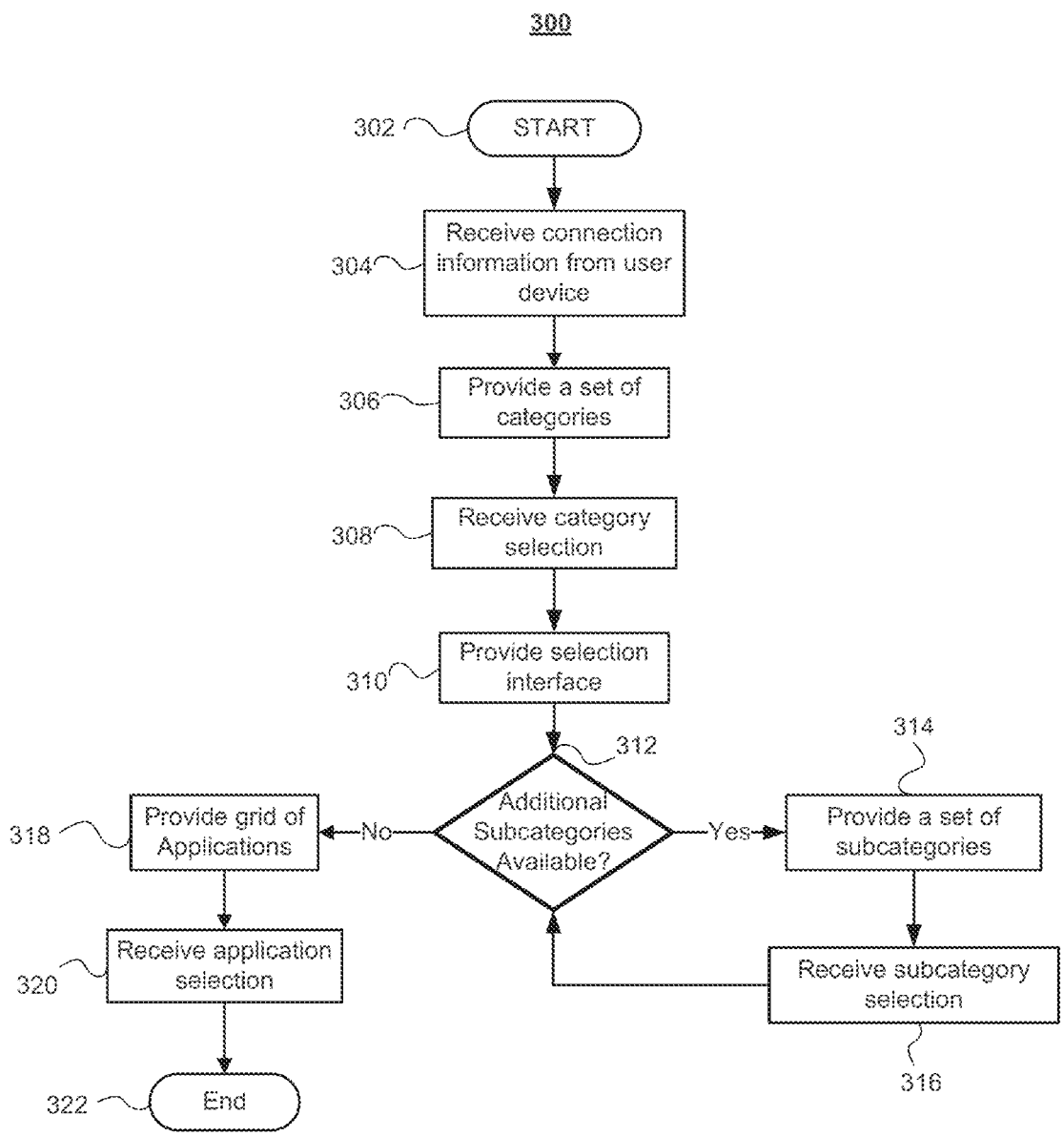
FIG. 3 is a block diagram of a method of a particular embodiment.

FIG. 3 is a flowchart illustrating the functionality of a method according to an embodiment of the disclosure. This method is provided by way of example, as there are a variety of ways to carry out the methods described herein. Method 300 shown in FIG. 3 may be executed or otherwise performed by one or a combination of various systems. The method 300 may be carried out through system 100 of FIG. 1 and/or the one or more modules shown in FIG. 2, by way of example, and various elements of FIG. 1 and FIG. 2 are referenced in explaining method 300 of FIG. 3. Each block shown in FIG. 3 represents one or more processes, methods, or subroutines carried out in method 300. Method 300 may begin at block 302.

At block 304, method 300 may receive connection information from a user device. A user device may connect to gridsearch system 110 via one or more networks (such as network 108). The user device may include a local application (e.g., gridsearch application 104) that allows the user device to interface with gridsearch system 110. The user may connect to a web portal or site hosted by gridsearch system 110 where the user may purchase and/or download applications for user device 102. When user device 102 has connected with gridsearch system 110, the screen on user device may display a screen similar to the one shown in FIG. 4A. Method 300 may proceed to block 306.

At block 306, method 300 may provide a set of categories. The categories may be broad classifications for a group of one or more applications. Each application may be assigned to one or more categories by gridsearch system 110 based on information provided by the application developer, the name of the application, the functions performed by the application, and other relevant information. The set of categories may be presented to the user via an interface on user device 102. The categories may be presented as a vertical list of icons, as shown on the left side of FIGS. 4A-4D. The categories may be presented in text-based form, as shown in FIG. 6. The categories may include, without limitation, "Finance", "Sports", "Entertainment", "Shopping", "Communications", and "Exercise". Method 300 may proceed to block 308.

At block 308, method 300 may receive a category selection from the user device. A user may select a category using the touchscreen on user device 102. The selection may be received by gridsearch module 110. Method 300 may proceed to block 310.

At block 310, method 300 may provide a selection interface. The interface may be in the form of a grid, an example of which is represented by element 430 in FIGS. 4A-4D. The selection interface may include a cursor, an example of which is shown by element 432 in FIGS. 4A-4D. The grid may be arranged horizontally (as shown in FIG. 4A-4D). The grid may be arranged vertically. The grid may be circular. The cursor may resemble, without limitation, a button, a box, a circle, or a highlighted region. The cursor may be configured to move through the grid in response to a user interacting with the cursor (e.g., the cursor may move continuously through the grid, or in discrete movements). Method 300 may proceed to block 312.

At block 312, method 312 may determine whether there is an additional level of subcategories based on the selection. Each category may be associated with one or more levels of subcategories. Each subcategory may be associated with a further level of subcategories. Each application may be assigned to one or more subcategories. If there is a level of subcategories available, method 300 may proceed to block 314. If not, method 300 may proceed to block 318.

At block 314, method 300 may provide a set of subcategories based on the received selection in box 308. The subcategories may be assigned to the previously selected category or subcategory. Each application may have been assigned to one or more subcategories by gridsearch system 110 based on information provided by the application developer, the name of the application, the functions performed by the application, and other relevant information. The set of subcategories may be presented to the user via an interface on user device 102. The categories may be presented as a horizontal text-based list of icons, as shown on the top of FIGS. 4B-4D. The subcategories may be presented as icons. Examples of subcategories are shown in FIG. 4B: "TV" 412, "Movie" 414, "Radio" 416, "Games" 418, and "Sports"

420—all within the category of "Entertainment" 406. Referring to FIG. 4A, within the "finance" category 402, subcategories may include, without limitation, "banking", "investing", "accounting", "bill paying", and "financial news". Subcategories within the "communications" category 404 may include, without limitation, "location services", "caller name ID", "widgets", "messaging", "voice mail", "email", and "searching". Subcategories within the "shopping" category 408 may include, without limitation, "rewards", "deals", "mapping", "restaurants", "clothing", "electronics", "appliances", "home & garden". Subcategories within the "sports" category 410 may include, without limitation, "Professional Sports", "College sports", "TV", "Football", "Basketball", "Hockey", "Soccer", and "Baseball". Gridsearch system 110 may assign the same subcategory to multiple categories. For example, the subcategory "professional sports" may be a subcategory for both "Sports" 410 and "Entertainment" 406. Method 300 may proceed to block 316.

At block 316, method 300 may receive a subcategory selection from the user device. A user may select a subcategory using the touchscreen on user device 102. The selection may be received by gridsearch module 110. The user may select the subcategory using the grid and cursor described in reference to block 310 above. As the cursor is moved through the grid in a certain direction, a corresponding subcategory may be selectable. Embodiments of this process are shown in FIGS. 4C, 5A, and 5B, and described above. For example, as described above, FIG. 5A shows an embodiment of a screen showing a second level of subcategories 522-530. This second level of subcategories may have been previously assigned to the subcategory "Movies" shown in FIGS. 5A and 5B. Gridsearch system 110 may display a grid with multiple rows and/or levels, where each row includes segments allowing a user to select a subcategory, and for each segment, the row below that segment allows the user to select another level of subcategories assigned to that subcategory.

As shown in FIGS. 5A and 5B, the user may select a subcategory by moving the cursor horizontally and vertically within the grid interface (as presented in block 310). The user may select the subcategory similar to the way the user selected the category or previous subcategory. The process may repeat at block 312 if there are additional subcategories within the selected subcategory.

At block 318, if no additional subcategories are available in the selected subcategory (from block 316) or category (from block 308), method 300 may provide a grid of one or more applications for display on user device 102. Gridsearch system 110 displays applications that were previously assigned to the subcategory selected in box 316 (or the category selected in box 308, if no subcategories exist within that category). The applications may be displayed as icons, as shown in the embodiment of FIG. 4D. The applications may be displayed horizontally, vertically, or in some other arrangement. Method 300 may proceed to block 320.

At block 320, method 300 may receive an application selection from the user device 102. A user may select an application using the grid and cursor interface (described in block 310). The cursor may be configured to move in a horizontal direction through the grid, and/or in a vertical direction. As the user moves the cursor through the grid, one of the applications may be highlighted, allowing the user to "select" that application (e.g., by tapping the cursor, holding down the cursor, voice commands, etc.). Once the user selects the application, gridsearch system 110 may direct the user to a new screen that includes information about the application, instructions for how the user may download the application onto user device 102, and/or any payment information. For example, if the user selects application 428 (Netflix) (shown in FIG. 4D), gridsearch system 110 may display one or more screens showing specific information about the Netflix application for user device 102. Information may include the price, the memory required for the application, the maker, a description of the functions performed by the application, ratings and reviews of the application provided by other users, version information, and/or updates. At block 322, method 300 may end.

Category module 204 may be configured to update the categories and subcategories, depending on the types of applications received from application provider 106. Application provider 106 may periodically provide new applications to gridsearch system 110. In some embodiments, a third party may update the categories and/or subcategories based on received applications.

The various computing devices above (including phones and network equipment), generally include computer-executable instructions, where the instructions may be executable by one or more processors. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

Databases, data repositories or other data stores described herein, such as the data storage 120, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A device, comprising:
one or more memories; and
one or more processors, communicatively coupled to the one or more memories, to:
provide an interface for display on a screen of a user device,
the interface including a set of one or more categories arranged in a first direction along a first side of the interface;
receive, from the user device, a selection of a first category within the set of one or more categories;
provide a set of one or more subcategories for display within the interface,
the set of one or more subcategories being associated with the first category,
the set of one or more subcategories being arranged in a second direction along a second side of the interface,
the second side being different from the first side, and
the second direction being different from the first direction;
display a first grid within the interface based on the selection of the first category,
the first grid including a selectable cursor that is movable within the first grid in response to an input from a user of the user device;
receive a selection of a first subcategory within the set of one or more subcategories from the user device,
the selection being received based on the selectable cursor being moved from a first position in the first grid to a second position in the first grid and pressing or tapping the second position in the first grid,
the second position being in a location associated with the first category and the first subcategory;
provide, based on receiving the selection of the first subcategory, a set of one or more applications within the interface, based on a search performed on an application provider database for the set of one or more applications,
the set of one or more applications being associated with the first subcategory;
display a second grid adjacent to the first grid based on the selection of the first subcategory,
the selectable cursor being movable between the first grid and the second grid;
receive a selection of a first application within the set of one or more applications from the user device,
the selection being received based on the selectable cursor being moved from the second position in the first grid to a particular position in the second grid and based on pressing or tapping the particular position in the second grid,
the particular position being associated with the first application; and
provide information associated with the first application within the interface.

2. The device of claim 1, wherein the one or more processors are further to:
receive a request from the user device to download the first application; and
transmit a copy of the first application to the user device.

3. The device of claim 1, wherein the screen on the user device comprises a touchscreen.

4. The device of claim 1, wherein each category within the set of one or more categories is displayed as at least one of:
a text block,
an icon, or
an image.

5. The device of claim 1, wherein each subcategory within the set of one or more subcategories is displayed as at least one of:
a text block,
an icon, or
an image.

6. The device of claim 1, wherein the first direction of the set of one or more categories is vertical and the second direction of the set of one or more subcategories is horizontal with respect to the interface of the user device.

7. The device of claim 1, wherein the first grid is arranged horizontally or vertically with respect to the interface of the user device.

8. The device of claim 1, wherein each application in the set of one or more applications is associated with at least one of at least one category in the set of one or more categories and at least one subcategory in the set of one or more subcategories.

9. The device of claim 1, wherein the selectable cursor includes at least one of:
a box, a circle, or a lit space; and wherein the one or more processors, when receiving the selection of the first subcategory within the set of one or more subcategories from the user device, is to:
receive the selection of the first subcategory based on the user device receiving input associated with the selectable cursor being pressed or tapped.

10. The device of claim 1,
wherein the set of one or more subcategories is a first set of one or more subcategories; and
wherein the one or more processors are further to:
provide a second set of one or more other subcategories for display within the interface,
provide an intermediate grid adjacent the first grid, the selectable cursor being movable between the first grid and the intermediate grid, and
receive another selection of another subcategory within the second set of one or more other subcategories based on the selectable cursor being moved from the second position in the first grid to a particular position in the intermediate grid.

11. A method, comprising:
providing, by a device, an interface for display on a screen of a user device,
the interface including a set of one or more categories arranged in a first direction along a first side of the interface;
receiving, by the device and from the user device, a selection of a first category within the set of one or more categories;
providing, by the device, a set of one or more subcategories for display within the interface,
the set of one or more subcategories being associated with the first category,
the set of one or more subcategories being arranged in a second direction along a second side of the interface,
the second side being different from the first side, and
the second direction being different from the first direction;
displaying, by the device, a first grid within the interface based on the selection of the first category,
the first grid including a selectable cursor that is movable within the first grid in response to an input from a user of the user device;
receiving, by the device, a selection of a first subcategory within the set of one or more subcategories from the user device,
the selection being received based on the selectable cursor being moved from a first position in the first grid to a second position in the first grid and pressing or tapping the second position in the first grid,
the second position being in a location associated with the first category and the first subcategory;
providing, by the device and based on receiving the selection of the first subcategory, a set of one or more applications within the interface, based on a search performed on an application provider database for the set of one or more applications,
the set of one or more applications being associated with the first subcategory;
displaying, by the device, a second grid adjacent to the first grid based on the selection of the first subcategory, the selectable cursor being movable between the first grid and the second grid;

receiving, by the device, a selection of a first application within the set of one or more applications from the user device,
the selection being received based on the selectable cursor being moved from the second position in the first grid to a particular position in the second grid and based on pressing or tapping the particular position in the second grid,
the particular position being associated with the first application; and
providing, by the device, information associated with the first application within the interface.

12. The method of claim 11, further comprising:
receiving a request from the user device to download the first application; and
transmitting a copy of the first application to the user device.

13. The method of claim 11, wherein the screen on the user device comprises a touchscreen.

14. The method of claim 11, wherein each category within the set of one or more categories is displayed as at least one of:
a text block,
an icon, or
an image.

15. The method of claim 11, wherein each subcategory within the set of one or more subcategories is displayed as one of:
a text block,
an icon, or
an image.

16. The method of claim 11, wherein the first direction of the set of one or more categories is vertical and the second direction of the set of one or more subcategories is horizontal with respect to the interface of the user device.

17. The method of claim 11, wherein the first grid is arranged horizontally or vertically with respect to the interface of the user device.

18. The method of claim 11, wherein each application in the set of one or more applications is associated with at least one of at least one category in the set of one or more categories and at least one subcategory in the set of one or more subcategories.

19. The method of claim 11, wherein the selectable cursor includes at least one of:
a box,
a circle, or
a lit space; and
wherein receiving the selection of the first subcategory within the set of one or more subcategories from the user device comprises:
receiving the selection of the first subcategory based on the user device receiving input associated with the selectable cursor being pressed or tapped.

20. The method of claim 11,
wherein the set of one or more subcategories is a first set of one or more subcategories; and
wherein the method further comprises:
providing a second set of one or more other subcategories for display within the interface,
providing an intermediate grid adjacent the first grid, the selectable cursor being movable between the first grid and the intermediate grid, and
receiving another selection of another subcategory within the second set of one or more other subcategories based on the selectable cursor being moved from the second position in the first grid to a particular position in the intermediate grid.

\* \* \* \* \*